United States Patent [19]

Bassani

[11] 4,098,861
[45] Jul. 4, 1978

[54] WIRE COATING USING A LIQUID POLYMER

[75] Inventor: Giovanni Bassani, Midland, Mich.

[73] Assignee: Dow Corning Corporation, Midland, Mich.

[21] Appl. No.: 728,345

[22] Filed: Sep. 30, 1976

[51] Int. Cl.$^2$ .............................................. B29F 3/10
[52] U.S. Cl. ................................ 264/174; 264/176 R; 264/240; 264/349; 425/113
[58] Field of Search ....................... 264/68, 174, 176 R, 264/176 C, 209, 349, 240; 425/113, 206, 207; 428/295, 447; 260/37 SB

[56] References Cited

U.S. PATENT DOCUMENTS

| 3,689,610 | 9/1972 | Nicholson | 264/174 X |
| 3,697,473 | 10/1972 | Polmanteer | 260/37 SB |
| 3,953,006 | 4/1976 | Patarcity | 425/207 X |

FOREIGN PATENT DOCUMENTS

| 1,345,761 | 11/1963 | France. |
| 1,354,467 | 1/1964 | France. |

*Primary Examiner*—Thomas P. Pavelko
*Attorney, Agent, or Firm*—Howard W. Hermann

[57] ABSTRACT

In accordance with a preferred embodiment of this invention there is provided a method and apparatus for coating a wire or cable with a thermosetting polymer formed from a "liquid polymer" system such as a two-component polysiloxane. This system may be characterized as having two components each having a low viscosity and which when mixed react quickly to form the cross-linked polysiloxane rubber.

2 Claims, 3 Drawing Figures

WIRE COATING USING A LIQUID POLYMER

The present invention relates to extrusion or wire coating processes and equipment and, more specifically, to such processes and equipment capable of employing the newly developed, low viscosity multicomponent polymer systems often termed "liquid polymers."

Most commonly used extrusion, and more particularly wire and cable coating, processes employ thermoplastic polymer resins which, even when melted, are thick viscous materials. These resins are typically in solid pellet form as they are fed into the extruder or wire coater. Once in the equipment the pellets are heated, melted and extruded in the desired shape and then quenched to the solid state. However, at no point in the process is the viscosity of these materials very low. As a result, considerable energy and time are required to form these resins into the desired shape.

Recently, several types of low viscosity or "liquid polymer" formulations have been developed. Such formations have been suggested for both organic and inorganic (e.g., silicone) polymers. In this specification, the term "liquid polymer" will be used to designate those polymers in which two or more reactive liquid ingredients, having relatively low viscosities, are blended to form a rapidly reacting mixture which cures to form a solid crosslinked polymer.

It is an object of this invention to provide a new and improved high speed extruder specifically designed to extrude organic or inorganic "liquid polymers" and to more fully exploit their advantages. In the practice of this invention, the low viscosity liquid components, which eventually react to form the desired product, are preheated and pumped into the extruder under pressure and this initial pressure is the primary force which mixes the components and which carries them through the extruder. The subject extruder is able to process the polymers several times faster than conventional processes and one feature that contributes to this increased speed is that the extruder does not depend on a conventional rotating screw to transport or mix the components.

It is an additional object of this invention to provide a new and improved high speed wire coater specifically designed to employ organic or inorganic "liquid polymers." The low viscosity liquid components, which eventually react to form the desired polymer coating are preheated and pumped into the subject wire coater under pressure and this initial pressure is the primary force which mixes and carries the components through the subject wire coater. In addition, the subject coating has a lower incidence of pin hole defects than coatings produced by processes employing conventional polymer resins.

It is a still further object of this invention to provide a high speed wire coater specifically adapted to rapidly coat a wire or cable with a cured silicone elastomer formed from a preheated and platinum catalyzed "liquid polymer" in which the curing reaction is the Si—H addition across a carbon-carbon double bond and which elastomer does not require a post-coating, heat curing step.

In accordance with a preferred embodiment of this invention, these and other objects are accomplished by heating and pumping the components of a liquid polymer into a wire coater having a die which is held in a barrel which has a tapered bore in fluid communication with the die opening. The barrel is mounted on a supporting base member. A mandrel having a tapered end is positioned inside the barrel with the tapered end pointed toward the die; preferably the mandrel is rotated during the wire coating operation. The inner surface of the barrel and the mandrel's surface form a mixing chamber through which the liquid polymer components pass, hot and under pressure, and in which they are thoroughly mixed to form a rapidly reacting mixture as they are forced through the coater. To ensure an adequate degree of mixing, either the mandrel's surface in the mixing chamber or the inner surface of the barrel or both may be equipped with mixing blades or fins.

The individual "liquid polymer" components are channeled into the mixing chamber, under pressure, through toroidal distribution rings which are positioned on the mandrel at a point so that as soon as the separate components leave the rings, they enter the mixing chamber. Each distribution ring receives one component which is preheated and under pressure through separate inlet ports in the barrel.

It is to be noted that neither the mixing chamber nor any other element of the coater assembly actually pumps the components or the reacting mixture toward the die. The "liquid polymer" components are introduced into the coater under pressure and it is this initial pressure which forces the material through the coater. The practitioner of this invention may control the throughput of the subject coater by controlling the initial pressure on the components as they enter the coater.

This invention will provide the wire and cable industry with a process which will operate several times faster than the presently used processes and will consume considerably less energy. In addition, it is believed that the use of the subject process will substantially reduce the frequency of pin hole defects since the viscosity of the subject coating material, as it goes on the wire, will be lower than the viscosity of the thermoplastic resins at this point. The subject invention will also provide a high speed process that produces a coating which is stronger, more dimensionally stable and more solvent resistant than the prior art processes. Many of these advantages are attributable in part to the nature of the coating provided by the subject process.

Applicant believes that in the past, this combination of advantages was not attainable since insofar as he is aware there was no commercially available wire coating process which used a "liquid polymer."

It is to be emphasized that the term "liquid polymer" is a term of art and is used to designate a thermosetting polymer formed by a rapid chemical reaction. The liquid reactive components (hereinafter "components") which react to form the polymeric product have relatively low viscosity and are typically stored separately to ensure stability and a reasonable shelf life. However, inhibitors may be used to allow the reactants to be mixed and form a storage-stable one component precursor which when heated rapidly reacts to form the desired thermoset polymer.

Further objects and advantages of the present invention will become readily apparent to those skilled in the art from the following detailed description in conjunction with the accompanying drawings in which.

Preferably, the "liquid polymer" has two low viscosity components. Both contain an organosilicone prepolymer having an aliphatically unsaturated pendent group, typically a vinyl group; examples of this prepolymer are described in U.S. Pat. Nos. 2,823,218; 3,419,593 and 3,697,473. This prepolymer is typically a polysiloxane oligomer. This first component also contains a platinum catalyst such as chloroplatinic acid. The second component also contains the prepolymer and, in addition, a crosslinking agent which is an organosilicon compound having at least two hydrogen atoms linked to a silicon atom per molecule. This crosslinking agent is often referred to as an SiH containing reactant since the SiH bond is the reactive moiety.

The two components will react very quickly, especially when heated to form a thermosetting (i.e., crosslinked) polysiloxane elastomer. This reaction is the SiH addition across the carbon-carbon double bond.

Preferably, the organosilicon prepolymer is a linear dimethylsiloxane oligomer having occasional methyl groups in terminal or pendent positions replaced by vinyl groups. The viscosity of the prepolymer is in the range of from about 20 to 4000 centipoise (1 pascal·second = 10.00 poise) as measured by a Brookfield viscometer at room temperature. The SiH compound is a linear dimethylsiloxane oligomer having occasional pendent methyl groups replaced by hydrogen. The number of hydrogen groups in the SiH compound and the number of vinyl groups in the prepolymer are adjusted so that the SiH to SiVi ratio is within the range of from 1 to 2 and preferably from about 1.3 to 1.6. The optimum SiH to SiVi ratio will depend on the particular compounds used; however, the SiH group should always be in excess. Typically, the catalyst is present in an amount ranging from 1 to 100 parts per million (ppm) platinum based on the total composition.

This polymerization reaction is described in the aforementioned patents which are hereby incorporated by reference to describe the polymerization reaction used in the subject invention and to describe a variety of suitable materials. These materials would include those materials described in the above patents which have a suitable viscosity and which quickly react to form crosslinked siloxane polymers.

Figure 1:
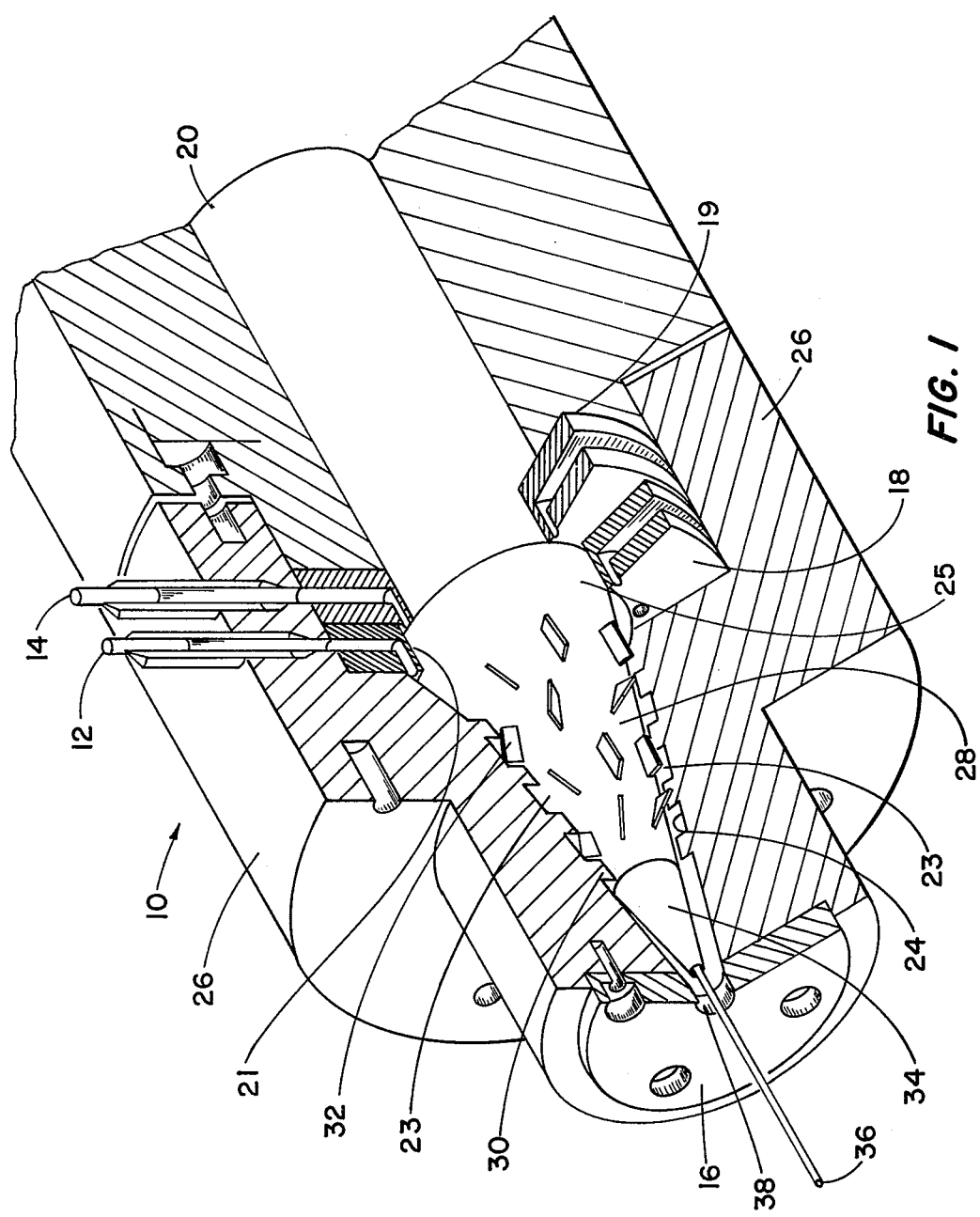
FIG. 1 is an elevated cut-away perspective view of the subject wire coater.

The components are individually preheated to a temperature in the range of from about 80° C. to about 200° C. and introduced into the subject wire coater 10, under a pressure in the range of from about 200 psi to about 3500 psi through inlet ports 12 and 14 (see FIG. 1).

It is to be emphasized that the viscosity of both components is low enough to allow the applied pressure be the only significant force acting on the coating material and that this pressure literally forces the resin through the coater 10. Therefore, the speed of the overall coating or extrusion process is dependent primarily upon, and controllable by, the initial pressure on the components as they enter the subject coater 10.

The rate of cure must be closely correlated with the resin throughput rate of the process since the resin must be cured to a substantially self-sustaining state as it leaves the die. If the resin cures too quickly the coater 10 will be plugged, while, on the other hand, if the resin cures too slowly, the coating on the wire as it emerges from the wire coater 10 will not maintain a uniform thickness. The temperature of the reacting mixture of the "liquid polymer" components, the catalyst concentration and the concentration of the reacting functionalities are preferably adjusted to provide a cure time of about one second. Then, the pressure under which the ingredients enter the wire coater can then be adjusted to provide a residence time of the reacting mixture in the wire coater 10 of from about 0.1 to about 0.4 of the curing time of the mixture at the given pressure.

The above description relates to the production of a thermosetting (i.e., crosslinked polysiloxane wire coating). However, it is emphasized that this invention may also be used to apply a coating of other thermosetting "liquid polymer" systems. However, the prepolymers, precursors, or ingredients of preferable candidate systems should have viscosities, and cure times similar to those of the preferred polysiloxane systems. Suitable examples would include the polyurethane liquid polymers which have received so much interest from the injection molders and the polysulfide liquid polymer which has been developed and marketed by the Thiokol Corporation.

The polyurethane systems typically involve the amine catalyzed reaction of an isocyanate (NCO) functionality with a hydroxyl (OH) functionality. The NCO containing compound is typically toluene diisocyanate and the hydroxyl containing compound is typically a polyoxyalkylene polyol. The polysulfide reaction typically involves the peroxide catalyzed reaction of an SH endcapped polyoxyalkylene with either another SH or a point of ethylenic unsaturation.

In evaluating a new candidate, important factors would include the viscosity of the individual components at a suitable reaction temperature and the cure time once the components are mixed at that temperature.

Referring to FIG. 1, the subject wire coater 10 comprises a barrel 26 which is mounted on a supporting base member (not shown). A mandrel 20 is rotatably mounted on said base member and disposed in the barrel 26. The mandrel has a tapered end 25 which tapers towards a die 16 which is attached to and held in place by the barrel 26. The wire 36 passes through a longitudinal axial channel in the mandrel 20 and is coated as it emerges from the mandrel 20. The heated liquid reactive components enter the wire coater 10, through inlet ports 12 and 14, pass through distribution rings 18 and 19, are blended in mixing chamber 23 and then applied to wire 36. The curing reaction reaches a point such that the coating on the wire is in a substantially self-sustaining state as it emerges from die 16; the curing reaction then continues until a crosslinked elastomer is formed.

Preferably, the tubular product is extruded vertically upwards because the take-up equipment which receives the product from the extruder may be adjusted to minimize the stress on the semi-cured extrudate as it emerges from the die 16.

The inlet ports 12 and 14 separately conduct the components to toroidal distribution rings 18 and 19 which uniformly distribute the components around the preferably rotating mandrel 20. The distribution rings are concentric with the mandrel and are placed one behind the other.

Figure 2:
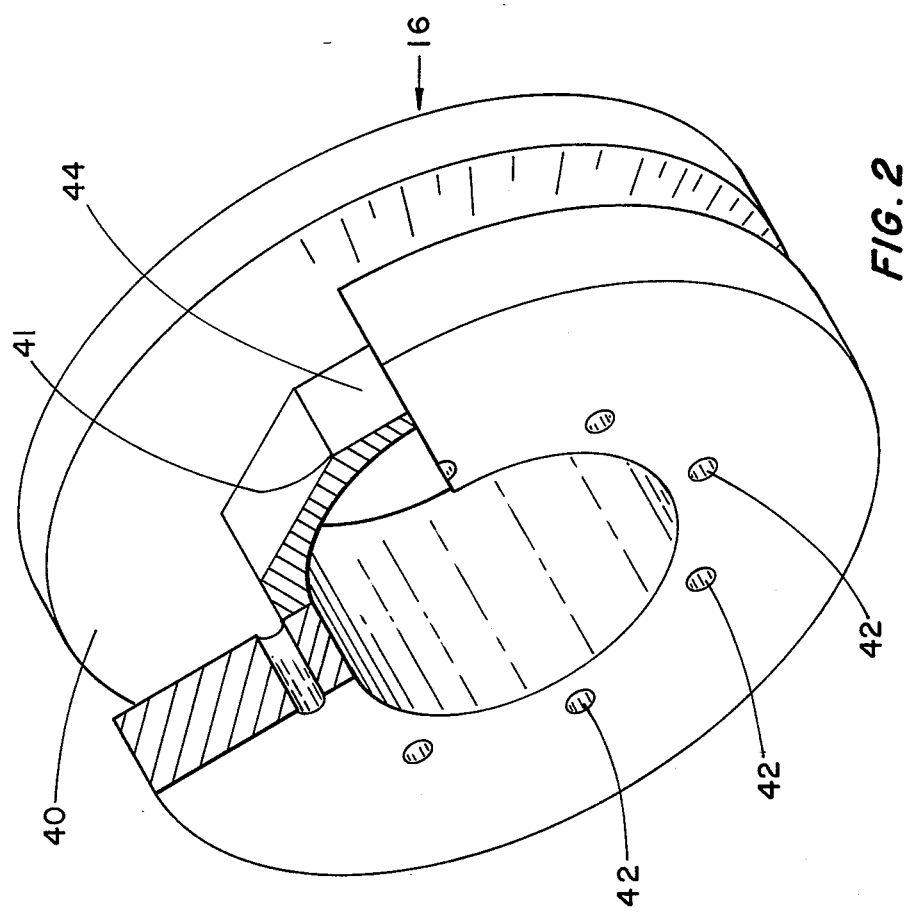
FIG. 2 is an elevated cut-away perspective view of a distribution ring which uniformly feeds one component into the mixing chamber.
Figure 3:
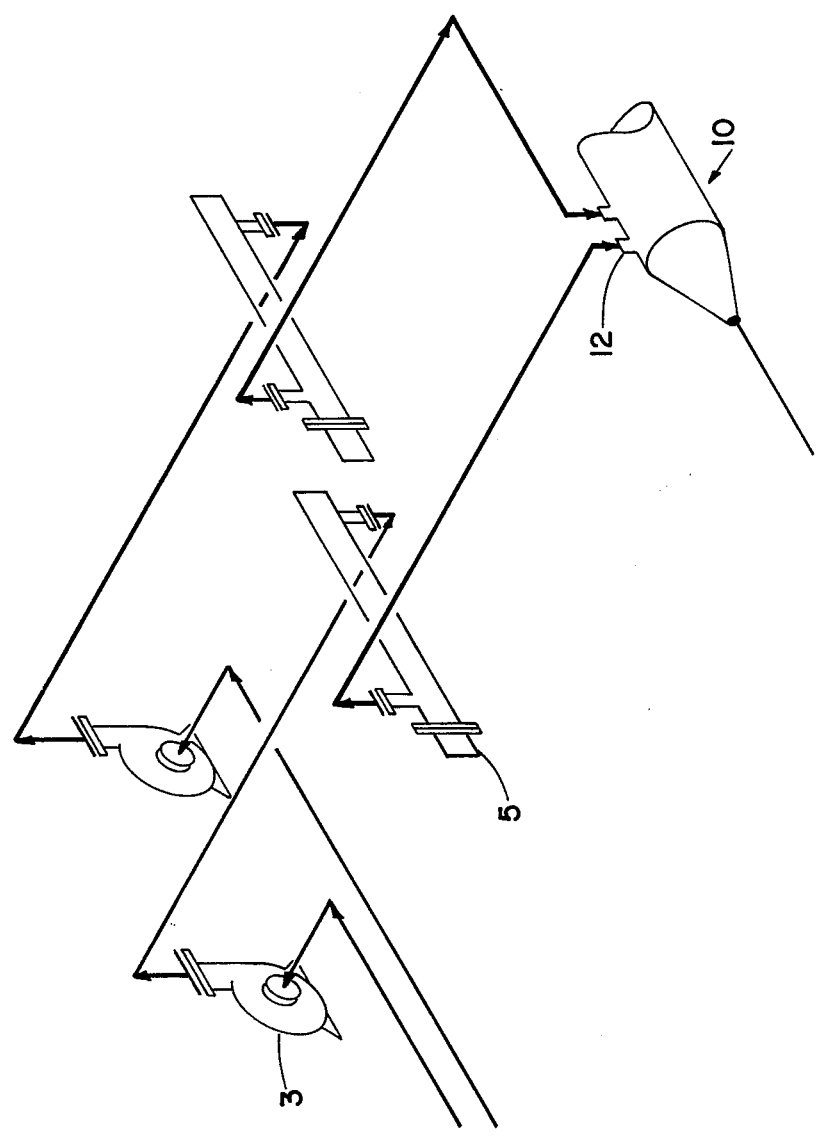
FIG. 3 is a representative view of the subject wire coater and its auxiliary equipment which includes a pump 3 and a heater 5 for each component.

As shown in FIGS. 1 and 2 each distribution ring receives a component from an inlet port and then uniformly distributes the component around the mandrel 20 and directs the flow of the component toward the mixing chamber 23. More specifically, and with reference to FIG. 2 the ingredient flows through an inlet port into an annularly shaped reservoir 40 in the distribution ring 18. Exit ports 42 leading from the annularly shaped reservoir 40 are uniformly spaced around the circumference of the mandrel 20. In FIG. 2 these exit ports 42 are circular, however, their exact shape may be varied considerably as long as they provide a uniform distribution of the component around the circumference of the mandrel 20.

Preferably, the total area of the exit ports 42 is less than the area of the inlet port 12. This will ensure that the inlet port 12 will have the capacity to deliver the component to the annularly shaped reservoir 40, at a volumetric rate which is greater than the volumetric rate at which the exit ports can empty the reservoir 40. This is necessary to ensure that the reservoir will always be full and thereby capable of uniformly delivering the component to all points around the circumference of the mandrel 20.

As also shown in FIG. 2 there is preferably a ridge 41 between each of the exit ports 42 on the inner surface 44 of the annularly shaped reservoir 40. These ridges ensure that there will be no "dead spots" in which small quantities of a component may be held for an extended period of time. Such precautions should be taken in the design of all components which form the flow path of the components and especially in the design of the mixing chamber 23 and all points downstream from that chamber, since once the reactants enter the chamber 23, they are mixed and the curing reaction beings. Any "dead spots" in the flow stream after mixture will collect the reacting mixture and eventually plug the subject wire coater 10.

In the design of the distribution rings 18 and 19 and the mixing chamber 23, it is important that there be a minimum distance for the components to flow from the last ring 18 to the mixing chamber 23 (see FIG. 1). This is due to the reactive nature of the components and possibility of the two reactants coming in contact and initiating a premature reaction before they react the mixing chamber 23. It may be advisable to extend the inner surface 21 of the distribution ring 18 to effectively separate the two concentric streams of reactive ingredients.

Once the components leave the distribution rings 18 and 19, they will enter the preferably conical mixing chamber 23 defined by the inner wall 24 of the barrel 26 and the surface 28 of the mandrel 20. As the components pass through the mixing chamber 23, they are thoroughly mixed and begin to react to form the final cured product. The residence time of the reacting mixture in the mixing chamber is carefully regulated to ensure that the reaction does not proceed to the point that the resin solidifies in the wire coater 10; this would require the disassembly and cleaning of the wire coater 10.

In accordance, with one preferred embodiment as shown in FIG. 1, the mixing chamber 23 has a plurality of mixing fins 30 attaching to the inner wall 24 of the barrel 26 and second plurality of mixing fins 32 attached to the mandrel 20. It is to be emphasized that the exact configuration of the internal structure of the mixing chamber 23 is not critical to the practice of this invention so long as the mixing chamber 23 is adequate to thoroughly mix the ingredients. In view of this, it is evident that the sets of fins 30 and 32 may be replaced with other mixing configurations such as threads, grooves or simply roughened surfaces.

Adequate mixing is a requirement of the subject process since if the reactants are not thoroughly blended the ultimate coating will not be continuous; that is, there will be significant variations in the degree of cure. This is not an acceptable condition. Preferably, the mandrel 20 is rotated and the speed of rotation may be controlled to ensure adequate mixing.

In a particular embodiment, once the uniformly blended reacting mixture leaves the mixing chamber 23, this mixture passes over the tip 34 of mandrel 20 and onto the wire 36 which is moving at a speed of about 1000 meters per minute (mpm) or more. The tip 34 provides a smooth surface over which the reacting mixture flows as it passes from the mixing chamber 23. In addition, the tip 34 positions the rapidly moving wire in the center of the die opening 38. This is necessary to ensure that the coating 40 has a uniform thickness.

The shape of tip 34 may be altered to transform the subject wire coater 10 into an extruder for producing either tubing or solid rod. For example, if the wire were not used and a solid tip were substituted for the hollow tip 34 shown in FIG. 1, the subject wire coater 10 would produce a solid rod. Similarly, if the tip 34 were solid and equipped with a projection which extended through the die, the subject wire coater 10 would extrude a hollow tube.

It is noted that the subject device may be used to produce a rod, a tube or a coated wire; however, the subject device will be most efficient and most productive in producing a coated wire. The reason is that the wire provides support for the curing extrudate as it emerges from the die. This support reduces the degree of cure of the extrudate necessary to achieve dimensional stability in the final cured product and therefore allows higher production rates.

In designing the subject wire coater 10 for a particular application the following calculations will be useful. Initially one must know the dimensions of the coated wire and the estimated speed at which the unit will operate. For purposes of this example a wire having a 1.0 mm diameter will be given a coating 1.5 mm thick. The design speed of the equipment will be 800 meters per minute (i.e., 13.3 meters/second). It is assumed that the specific gravity of the coating material will be about 1.25. Given these conditions the coating on the final product has a linear density of about 15 grams per meter and the flow rate of the coating material is about 195 grams per second.

In determing an appropriate volume for the mixing chamber, a reasonable cure time of the liquid polymer may be assumed to be about one second. The temperature of the ingredients as they enter the wire coater may be adjusted to provide the assumed cure time. Based on the above, the volume of the mixing chamber should be in the range of from 15 to 45 grams, since this would mean that a given volume of the material would have a residence time in the mixing chamber of from about 10 percent to 20 percent of its total cure time of one second. During the start-up of the wire coater it will be necessary to balance the temperature and the linear speed of the wire to reach a range where the risk of plugging the mixing chamber is reduced to a tolerable level and yet where the coating resin is cured to a substantially self-sustaining state as it leaves the die and is thereby able to maintain acceptable dimensional stability. With some specific coating materials it may be possible to increase the portion of the cure time which the material spends in the mixing chamber above the aforementioned 20 percent level. This may be desirable, since the more time the ingredients spend in the mixing chamber the more thorough the mixing process.

Many aspects of the preferred embodiment which is described above may be modified within the scope of this invention. For example, a three ingredient formulation may be employed by adding one additional inlet port and distribution ring. It will also normally be necessary to add a pump and a heater to supply the third ingredient at the proper temperature and pressure. However, if a third ingredient is added it will be necessary to exercise care to ensure that no two mutually reactive ingredients are in contact for any significant period before they enter the mixing chamber 23. Other modifications will be readily apparent to those skilled in the art in view of this specification. Therefore, the scope of this patent is not to be limited to the specific embodiments which have been described for illustrative purposes but rather by the following claims.

That which is claimed is:

1. An improved method of rapidly coating a wire with a crosslinked elastomer which is formed by mixing under heat and pressure multiple components of a liquid polymer system, said method comprising the steps of:
    (a) separately heating the components of the liquid polymer system to a temperature at which when the components are mixed the curing reaction will require from about 0.5 to about 3.0 seconds, said components having a viscosity of from about 20 to about 4000 centipoises;
    (b) separately pumping under pressure the heated components into an extruder barrel through separate inlet ports thereof, each port adapted to receive one of the heated components;
    (c) passing a wire to be coated axially through a hollow rotatable mandrel located within said barrel and through a die attached to one end of said barrel, said mandrel having a tapered end tapering toward said die, said barrel and the outer surface of the tapered end of said mandrel forming a mixing chamber,
    (d) distributing the heated components around the circumference of said mandrel in said barrel,
    (e) rotating said mandrel to cause mixing of the components in said mixing chamber, whereby pressure from said pumps causes extrusion of the mixed components onto said wire as it cures and passes through the die and coats said wire.

2. The method defined in claim 1 wherein distributing the heated components around the circumference of said mandrel is accomplished by a plurality of toroidal distribution rings disposed inside the barrel and surrounding the mandrel, each ring receiving one component from one of the inlet ports.

* * * * *